United States Patent
Schweikert

(10) Patent No.: US 6,297,944 B1
(45) Date of Patent: Oct. 2, 2001

(54) CAPACITOR ASSEMBLY HAVING AN ALUMINUM ELECTROLYTIC CAPACITOR

(75) Inventor: Wilhelm Schweikert, Heidenheim (DE)

(73) Assignee: EPCOS AG, Munich (DE)

( * ) Notice: Subject to any disclaimer, the term of this patent is extended or adjusted under 35 U.S.C. 154(b) by 0 days.

(21) Appl. No.: 09/468,374

(22) Filed: Dec. 20, 1999

Related U.S. Application Data

(63) Continuation of application No. PCT/DE98/01256, filed on May 5, 1998.

(30) Foreign Application Priority Data

Jun. 18, 1997 (DE) ................................................ 197 25 844

(51) Int. Cl.$^7$ .................................. H01G 9/10; H01G 9/04
(52) U.S. Cl. .......................... 361/520; 361/518; 361/511
(58) Field of Search ..................................... 361/517, 518, 361/519, 520, 521, 503, 508, 509–512, 513, 514, 515, 528–531, 535–538, 540

(56) References Cited

U.S. PATENT DOCUMENTS

| | | | |
|---|---|---|---|
| 2,623,101 | * 12/1952 | Kurland et al. | 361/520 |
| 3,091,656 | * 5/1963 | Lamoureaux, Jr. | 174/52.3 |
| 3,976,922 | * 8/1976 | Peck et al. | 361/434 |
| 4,131,935 | * 12/1978 | Clement | 361/520 |
| 4,514,788 | * 4/1985 | Klaschka et al. | 361/519 |
| 5,579,203 | * 11/1996 | Klaschka | 361/519 |
| 5,706,166 | * 1/1998 | Schweikert et al. | 361/520 |

* cited by examiner

Primary Examiner—Dean A. Reichard
Assistant Examiner—Eric Thomas
(74) Attorney, Agent, or Firm—Herbert L. Lerner; Laurence A. Greenberg; Werner H. Stemeer

(57) ABSTRACT

A capacitor assembly includes an aluminum electrolytic capacitor installed in a casing which is closed by a cover disc. Two metallic connecting elements, which are solid, are disposed in the cover disc. The connecting elements are connected to external connections through the use of a radially acting clamping connection.

6 Claims, 2 Drawing Sheets

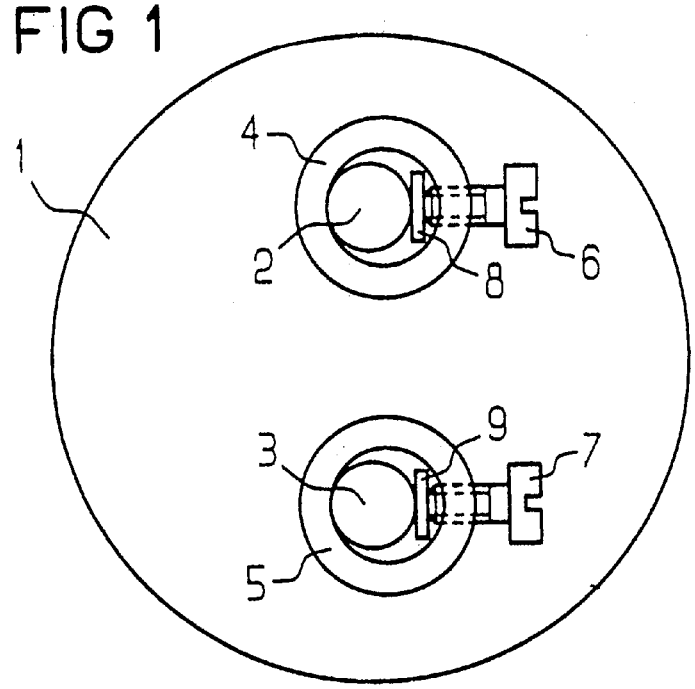
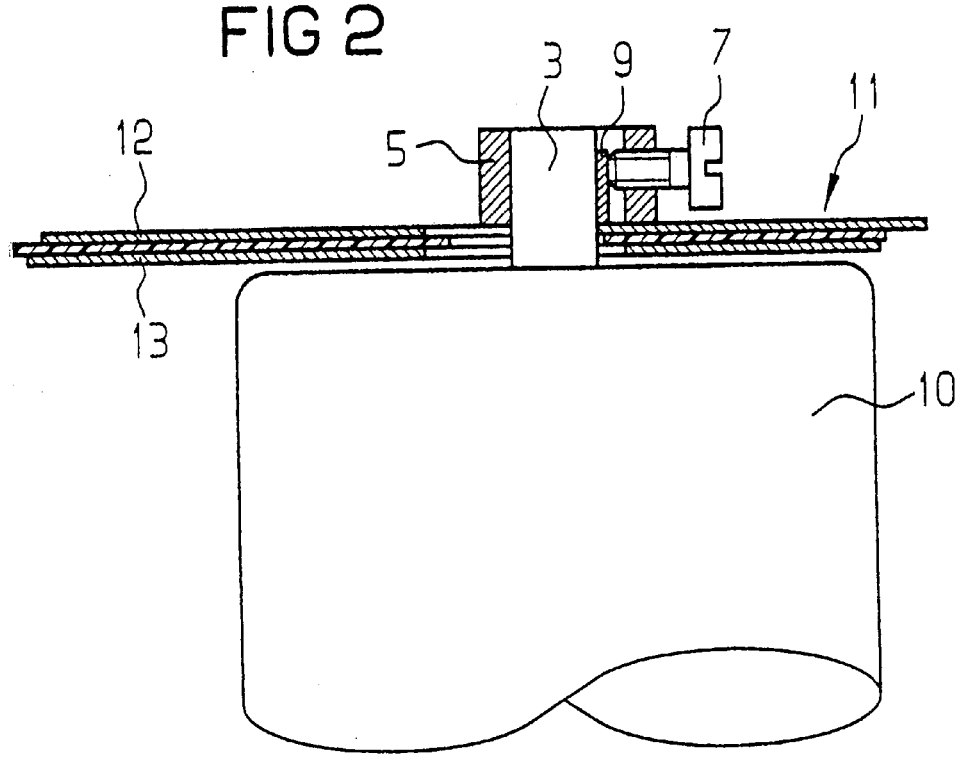

CAPACITOR ASSEMBLY HAVING AN ALUMINUM ELECTROLYTIC CAPACITOR

CROSS-REFERENCE TO RELATED APPLICATION

This application is a continuation of copending International Application No. PCT/DE98/01256, filed May 5, 1998, which designated the United States.

BACKGROUND OF THE INVENTION

Field of the Invention

The invention relates to a capacitor assembly having an aluminum electrolytic capacitor which is installed in a casing that is closed by a cover disc, and two metallic connecting elements disposed in the cover disc for capacitor connections.

Such a capacitor assembly is known, for example, from the Siemens Matsushita Components Datenbuch 1997 "Aluminum Electrolytic Capacitors", pages 62–68.

There, the connecting elements have an internal thread, with conductors or busbars preferably being attached through the use of screws or threaded pins. In that case the connecting element on the anode side in the cover disc is composed of pure aluminum (Al 99.5 and purer), since it is wetted with electrolyte in the interior of the capacitor and a blocking oxide layer must be formed. The low strength of the soft, pure aluminum only permits low tightening torques when the electrical connections are attached, often leading to the thread being damaged during the fitting process. Furthermore, it is also quite common for connections to become loose again when stressed mechanically, resulting in poor contact.

In addition to the difficulties described above, the length tolerance of the components is a major problem when interconnecting a plurality of capacitors to form capacitor banks. On one hand, in order to dissipate the heat losses well, the base of the capacitor cup should be pressed firmly against the mounting plate. On the other hand, due to the increasing current load, the elements used for interconnection are becoming ever more solid and less flexible. That necessitates special length compensating elements, or interconnecting elements having a complex construction. The boards used for interconnection are generally seated on the upper level of the screw connections, which leads to increased inductance between the screw connections of the connecting elements.

Although it is possible to overcome the problem of low tightening strengths by using larger connecting threads, that in turn results in considerably greater costs for the cover disc. Length compensation through the use of compensating elements or through the use of more or less flexible connecting elements generally leads to unsatisfactory compromises with respect to heat dissipation and inductance, so that the structural configuration options for interconnection are highly constrained.

SUMMARY OF THE INVENTION

It is accordingly an object of the invention to provide a capacitor assembly having an aluminum electrolytic capacitor, which overcomes the hereinafore-mentioned disadvantages of the heretofore-known devices of this general type so as to ensure problem-free attachment while at the same time compensating for length tolerance of components and ensuring that inductance is as low as possible.

With the foregoing and other objects in view there is provided, in accordance with the invention, a capacitor assembly, comprising a casing having a cover disc closing the casing; an aluminum electrolytic capacitor installed in the casing; two solid, metallic connecting elements disposed in the cover disc for capacitor connections; external connections; and a radially acting clamping connection connecting the connecting elements to the external connections.

In accordance with another feature of the invention, the external connections are formed by a sandwich board for connecting the capacitor to a plurality of other aluminum electrolytic capacitors to form a capacitor bank.

In accordance with a further feature of the invention, the connecting elements have a round cross section.

In accordance with an added feature of the invention, the connecting elements have a cross section with surfaces.

In accordance with a concomitant feature of the invention, the connecting elements have a quadrilateral or hexagonal cross section with surfaces.

Other features which are considered as characteristic for the invention are set forth in the appended claims.

Although the invention is illustrated and described herein as embodied in a capacitor assembly having an aluminum electrolytic capacitor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic plan view of an electrolytic capacitor according to the invention.

FIG. 2 is a fragmentary, side-elevational view of the electrolytic capacitor according to the invention.

DESCRIPTION OF THE PREFERRED EMBODIMENTS

Figure 1A:
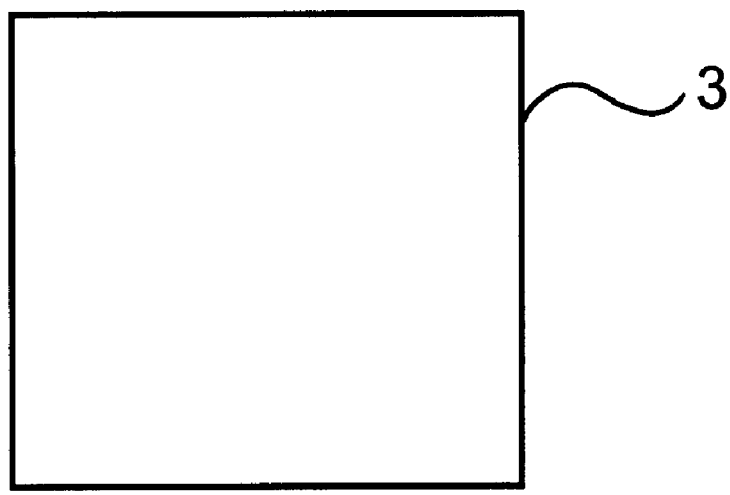
FIG. 1a is a front view of a connecting element having a quadrilateral cross section.
Figure 1B:
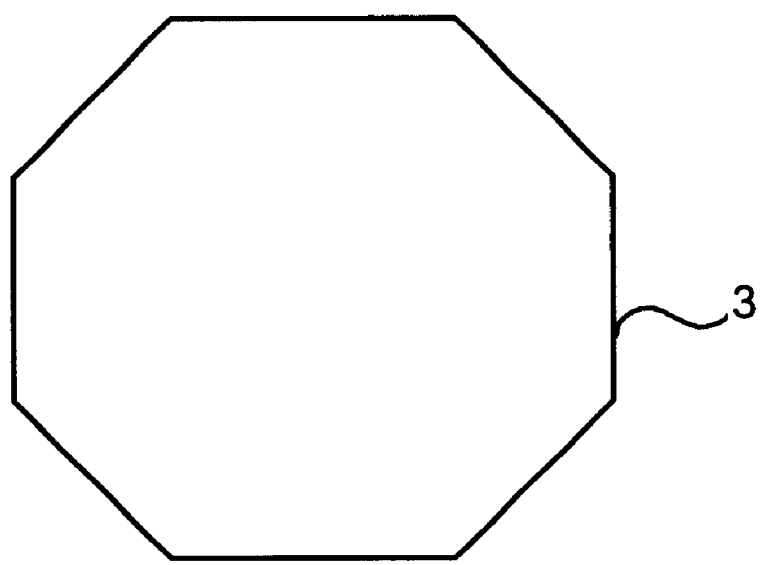
FIG. 1b is a front view of a connecting element having a hexagonal cross section.

Referring now to the figures of the drawings in detail and first, particularly, to FIG. 1 thereof, there is seen a capacitor assembly having a cover disc 1 which is composed of an insulating material. The cover disc 1 is a closure of a casing in which an aluminum electrolyte capacitor is installed. Two connecting elements 2, 3 are disposed in the cover disc 1, which is used as a closure for a capacitor cup (that is not shown in the figure). An anode and a cathode of the capacitor are respectively attached to the connecting elements 2, 3 on the inside.

The connecting elements 2, 3 are solid, that is to say they are constructed without threads. Clamping connections or apparatus 4, 5 are used for connecting external connections 8, 9. Screws 6, 7, which are disposed in the clamping connections 4, 5, firmly connect the clamping connections 4, 5 to the connecting elements 2, 3. In this case, the external connections are connecting tabs 8, 9 of a so-called "sandwich board", which is shown in FIG. 2. The connecting tabs 8, 9 are located between the screws 6, 7 and the connecting elements 2, 3.

FIG. 2 shows a side view of a capacitor 10. The clamping connection 5 and the screw 7 connect the connecting element 3 to the connecting tabs 9 and to an upper conductor track 12 on a sandwich board 11. A lower conductor track 13 is connected to the connecting element 4, which cannot be seen in FIG. 2.

The capacitor according to the invention has many advantages. The connecting elements 2, 3 may be composed of any high-strength material, so that the tightening torque can be designed to be very much greater, and can thus satisfy the normal criteria for installation. Length compensation for the capacitor casing is necessarily provided, since there is no longer any axial connection, with the clamping connections 4, 5 being connected radially. Furthermore, the connecting boards 11 can be lowered to the level of the capacitor cover disc 1, which considerably reduces interconnection inductance.

The above-described measures make the connecting elements 2, 3 simpler and smaller, as a result of which production costs can be considerably reduced.

The connecting elements 2, 3, which are shown in the figures as being round, may also have planar surfaces, for example by being constructed as quadrilaterals or hexagons.

Furthermore, it is also possible to use the capacitor 10 for horizontal mounting on printed circuit boards, with suitably constructed resting surfaces.

I claim:

1. A capacitor assembly, comprising:

a casing having a cover disc closing said casing;

an aluminum electrolytic capacitor installed in said casing;

two solid, metallic connecting elements disposed in said cover disc for capacitor connections;

external connections; and a clamping connection exercising only a radial pressure on said connecting elements to said external connections.

2. The capacitor assembly according to claim 1, wherein said external connections are formed by a sandwich board for connecting said capacitor to a plurality of other aluminum electrolytic capacitors to form a capacitor bank.

3. The capacitor assembly according to claim 1, wherein said connecting elements have a round cross section.

4. The capacitor assembly according to claim 1, wherein said connecting elements have a planar surface.

5. The capacitor assembly according to claim 1, wherein said connecting elements have a quadrilateral cross section.

6. The capacitor assembly according to claim 1, wherein said connecting elements have a hexagonal cross section.

* * * * *